United States Patent [19]

Nishino et al.

[11] Patent Number: 4,469,798
[45] Date of Patent: Sep. 4, 1984

[54] LOW MELTING, OPAQUE ENAMEL FRIT

[75] Inventors: Atsushi Nishino, Neyagawa; Kunio Kimura; Masaki Ikeda, both of Hirakata; Hajime Oyabu, Kawanishi, all of Japan

[73] Assignee: Matsushita Electric Industrial Company, Limited, Osaka, Japan

[21] Appl. No.: 433,819

[22] Filed: Oct. 12, 1982

[30] Foreign Application Priority Data

Oct. 13, 1981 [JP] Japan .................. 56-163253

[51] Int. Cl.³ .............................................. C03C 5/02
[52] U.S. Cl. ........................................ 501/14; 501/17; 501/24; 501/26; 501/77; 501/79
[58] Field of Search .............. 501/14, 17, 77, 24, 501/26, 79

[56] References Cited

U.S. PATENT DOCUMENTS

| | | | |
|---|---|---|---|
| 2,324,812 | 7/1943 | Bahnsen et al. | 501/24 |
| 3,459,574 | 8/1969 | Willcox et al. | 501/17 |
| 3,836,373 | 9/1974 | Ault et al. | 501/24 |
| 3,867,157 | 2/1975 | Peeling | 501/79 |
| 4,147,835 | 4/1979 | Nishino et al. | 501/17 |

FOREIGN PATENT DOCUMENTS 1496646 12/1969 Fed. Rep. of Germany .
1482766 4/1967 France .

Primary Examiner—Helen M. McCarthy
Attorney, Agent, or Firm—Lowe, King, Price & Becker

[57] ABSTRACT

A low melting, opaque enamel frit is described, which comprises 30 to 36 wt. % of $SiO_2$, 15 to 20 wt. % of $B_2O_3$, 7 to 9 wt. % of $Na_2O$, 5 to 10 wt. % of $ZrO_2$, 10 to 17 wt. % of $TiO_2$, 7 to 15 wt. % of $K_2O$, 2 to 10 wt. % of $F_2$ and 0.5 to 2.5 wt. % of $P_2O_5$. The total of $Na_2O$ and $K_2O$ is in the range of 15 to 20 wt. % and the total of $TiO_2$ and $ZrO_2$ is in the range of 15 to 20 wt. %. The $ZrO_2/(TiO_2+ZrO_2)$ ratio is in the range of 0.25 to 0.5:1 and the $SiO_2/B_2O_3$ ratio is in the range of 1.5 to 2.4:1. In addition, the $Na_2O/K_2O$ ratio is in the range of 0.6 to 1.0:1 and the $(Na_2O+K_2O)/(TiO_2+ZrO_2)$ is in the range of 0.7 to 1.2:1.

5 Claims, 9 Drawing Figures

LOW MELTING, OPAQUE ENAMEL FRIT

BACKGROUND OF THE INVENTION

1. Field of the Invention

This invention relates to low melting, opaque enamel frits free of lead by which they are harmless against human body and involve no ecological problems in or during the manufacturing or application thereof

2. Description of the Prior Art

One of the drawbacks involved in enameled metal wares is deformation thereof owing to the strain of steel plate bodies produced on firing. It is known that this strain is suppressed to a lesser extent at lower firing temperatures and no occurrence of the strain is experienced at temperatures below 723° C. which is the $A_1$ transformation point of steel plate. It is also known that low temperature firing will reduce defects of enameled wares produced by gases such as, for example, bubbles, pinholes, fishscales and the like. Moreover, recent rising cost of petroleum results in a relatively large proportion occupied by fuel cost in production cost of enameled wares. Therefore, there is a strong demand of enamels, which can be fired at low temperatures, from the standpoint of resource and energy savings.

As such is the case, various attempts have been made in Japan and abroad to manufacture low melting enamels comprising PbO or $P_2O_5$ as their main component. However, these enamels have ecological, safety and cost problems coupled with the fact that they are not so excellent in their characteristics as to take the place of conventional enamels. Thus, the known enamels are not satisfactory.

Currently used opaque enamels whose firing temperatures are over 800° C. can be broadly divided into two classes. One of the classes includes addition of titania at the time of mill addition. The other class includes use of $TiO_2$, zirconia and $Sb_2O_3$ as glass components and formation of opaque crystals on firing, which and may sometimes be called a titania opacified enamel.

Although these classes have the respective merits and demerits, the latter class is superior in luster, hiding power and whiteness.

Typical of known titania glazes for the titania opacified enamel frit are those which have a composition comprising 47.5 wt. % of $SiO_2$ (hereinafter referred to simply as %), 12.8% of $B_2O_3$, 11.9% of $Na_2O$, 2.9% of $K_2O$, 4.2% of $F_2$, 2.7% of $P_2O_5$, and 18.0% of $TiO_2$. The whiteness and opacity of the titania glaze is greatly influenced by the fundamental composition of glass even though the firing temperature is held constant. In other words, compositions having the same components greatly differ from one another in whiteness and opacity when the ratios of the components vary. It is known from experience that (1) adequate opacity cannot be obtained unless a $B_2O_3/Na_2O$ ratio is high; (2) if $SiO_2$ is decreased or if $Na_2O$ is increased, the resulting glaze assumes brown color; (3) addition of $Al_2O_3$ in small amounts results in the increase of opacity; and (4) where CaO, ZnO and MgO are added at levels of 5%, MgO has a slight effect on enhancement of opacity but the other components produce no effect.

As will be apparent from the experience of the known opaque enamels, even though compositions comprising no specific materials are used, the resulting frits will produce different characteristics depending on the ratio or manner of combination of the materials. Even a slight difference in composition may not bring out an intended, beautiful, white color. Accordingly, so far as the characteristics of frit are concerned, apparently similar frit compositions may be completely different from each other.

SUMMARY OF THE INVENTION

It is therefore an object of the present invention to provide an enamel frit which has a lower melting point than the $A_1$ transformation temperature of iron and is free of harmful lead.

It is another object of the invention to provide an enamel frit which, though applicable at lower temperatures than is the conventional case, exhibits excellent characteristics such as gloss, whiteness, hiding power, acid resistance, adhesiveness to substrate plate and the like comparable to ordinary enamels.

It is a further object of the invention to provide an enamel frit which permits saving of fuel cost by 25-35% as compared with ordinary high melting frits.

It is a still further object of the invention to provide an enamel frit which is applicable not only for decorative purposes, but also for insulative purposes.

It is another object of the invention to provide an enamel frit which is applicable to various metal bodies such as those of ordinary enameling steels, aluminium, aluminized steels and stainless steels.

The above objects can be achieved, according to the invention, by a low melting, opaque enamel frit which comprises at least a combination of 30 to 36% of $SiO_2$, 15 to 20% of $B_2O_3$, 7 to 9% of $Na_2O$, 5 to 10% of $ZrO_2$, 10 to 17% of $TiO_2$, 7 to 15% of $K_2O$, 2 to 10% of $F_2$, and 0.5 to 2.5% of $P_2O_5$, the total of $Na_2O+K_2O$ being in the range of 14 to 20%, the total of $TiO_2+ZrO_2$ being in the range of 15 to 20%, the $ZrO_2/(TiO_2+ZrO_2)$ ratio being in the range of 0.25 to 0.5:1, the $SiO_2/B_2O_3$ ratio being in the range of 1.5 to 2.4:1, the $Na_2O/K_2O$ ratio being in the range of 0.6 to 1.0:1, the $(Na_2O+K_2O)/(TiO_2+ZrO_2)$ being in the range of 0.7 to 1.2:1.

The present invention will become apparent from the following detailed description and accompanying drawings.

DETAILED DESCRIPTION OF THE INVENTION

Figure 1:
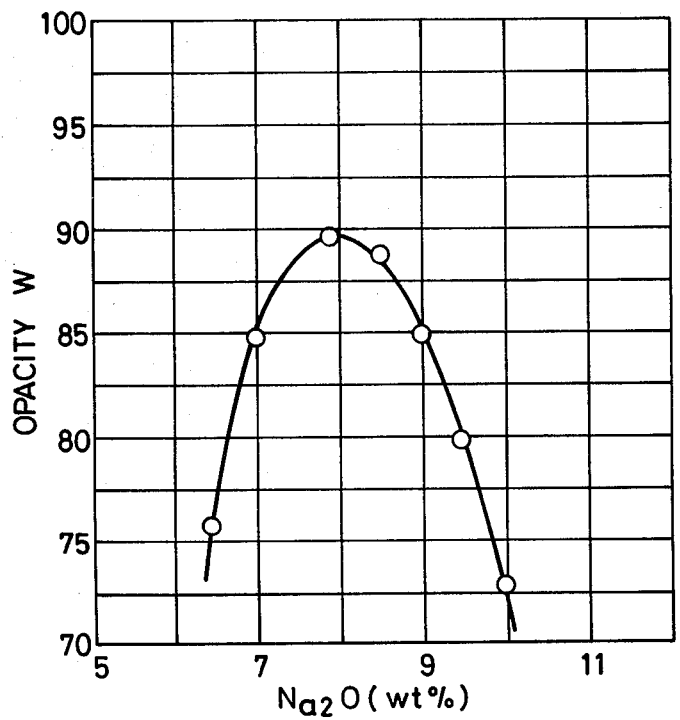
FIG. 1 is a graph showing the relation between the amount of $Na_2O$ and the whiteness of the resulting enamel.

As described above, the low melting enamel frit according to the invention comprises as its essential components $SiO_2$, $B_2O_3$, $Na_2O$, $ZrO_2$, $TiO_2$, $K_2O$, $F_2$ and $P_2O_5$.

$SiO_2$ and $B_2O_3$ are important oxides for glass formation and give a great influence on the thermal expansion coefficient, softening point and water proof. Usual enamels comprise over 45% of $SiO_2$ and about 15% of $B_2O_3$.

In order to lower the melting point of glass, reduction of $SiO_2$ is necessary but mere reduction of $SiO_2$ alone is accompanied by the adverse influence on the above-mentioned properties. In known low melting enamels, it is general to lower the melting point by addition of $P_2O_5$, PbO, or $Sb_2O_3$ without reduction of $SiO_2$. For instance, Japanese laid-open patent application No. 53-82826 teaches a so-called low melting frit which comprises 20 to 60% of $P_2O_5$.

In the frit of the invention, the $SiO_2$ content is in the range of 30 to 36% and the content of $B_2O_3$ is in the range of 15 to 20%. The general concept of enamel technology dictates the use of $SiO_2$ over 45%. Otherwise, the loss of luster or devitrification occurs, so that there cannot be obtained a beautiful enameled layer or surface. According to the present invention, however, $ZrO_2$ is contained as a component for lowering the melting point and thus the content of $SiO_2$ is sufficient to be in the range of 30 to 36%. Aside from the aforeindicated properties, the surface gloss and corrosion resistance are also greatly influenced by the content of $B_2O_3$ as well as that of $SiO_2$. In ordinary enamels, the $B_2O_3$ content is about 15%. In the practice of the invention, the content of $B_2O_3$ is in the range of 15 to 20%. Furthermore, the $SiO_2/B_2O_3$ ratio should suitably be within the range of 1.5 to 2.5:1. Less ratios outside the range result in foaming on the enameled surface and also in blackish opal color. On the contrary, larger ratios are disadvantageous in that the resulting frit cannot melt at temperatures below 723° C. with a loss of gloss. Known titania glazes have a $SiO_2/B_2O_3$ ratio of about 3.0. In this sense, the frit of the present invention is of the specific type.

The alkaline components of the frit according to the invention are described.

The essential alkaline components contained in the frit of the invention include $Na_2O$ and $K_2O$. Both the components are important for lowering the melting point and have suitable ranges of contents, respectively. The titania glazes for the titania opacified enamel frit are opalized as follows: $Ti^{+4}$ which has been taken in as a glass component at the time of the manufacture of frit in the form of ions grows, on heating, into crystalline particles of titanium oxide of the anatase type, leading to the high hiding power. The most excellent opacity is shown when the size of the crystal particles of titanium oxide is approximately 0.2 microns. The titanium oxide is composed of a major proportion of anatase crystals and a minor proportion of rutile crystals. Among various materials, titanium oxide particles have high refractive indices (the index of anatase is 2.52 and the index of rutile is 2.76), and thus titania glazes exhibit more excellent hiding power than zirconia or antimony glazes.

Accordingly, in order to promote the opalization, it is necessary that when molten, the frit becomes so flat that the inherent refractive index of titanium oxide is shown and that the crystallized titanium oxide is stably present in frit.

The titania glaze should satisfy the above requirements and suitable ranges of the alkali components should be limited so that the above requirements are satisfied. In other words, if the amounts of alkali components are smaller than as required, the frit does not melt and refraction at titanium oxide does not occur but irregular reflection takes place in the frit. By this, a beautiful white color cannot be obtained. On the contrary, when alkali components are in excess, crystallized titanium oxide particles react with an excess of alkilis to form titanium compounds. Accordingly, the hiding power of highly refractive titanium oxide does not result. For the reasons described above, the amount of $Na_2O$ in the low melting opaque enamel frit is in the range of 7 to 9% and the amount of $K_2O$ is in the range of 7 to 15%. This range of $Na_2O$ is not larger than in the case of known enamel frits but is rather smaller as compared with other types of low melting enamels. If the amount of $Na_2O$ is in excess, the gloss lowers with reduction of acid resistance. Accordingly, the suitable range of $Na_2O$ is 7 to 9%.

As mentioned, the suitable amount of $K_2O$ is in the range of 7 to 15%. $K_2O$ less contributes to the melting at lower temperatures of frit than $Na_2O$ and is an essential component for developing a white color. In this connection, however, when $K_2O$ is added in larger amounts than in the above range, an intended white color does not develop. $Na_2O$ and $K_2O$ may be substituted with each other to an extent but within the ranges of 7 to 9% and 7 to 15%, respectively. The total of $Na_2O$ and $K_2O$ should suitably be in the range of 14 to 20% and the $Na_2O/K_2O$ ratio should suitably be in the range of 0.6 to 1:1.

Aside from the above alkali components, $Li_2O$ may be added to the frit. $Li_2O$ has a greater effect on the low temperature melting of frit than $Na_2O$ and $K_2O$. However, addition of $Li_2O$ over 3% gives an adverse influence on the development of white color. The effect of $Li_2O$ is similar to that of $Na_2O$, and $Li_2O$ has a greater influence on the gloss, low temperature melting of frit and whiteness than $Na_2O$. Accordingly, the amount of $Li_2O$ is limited and when $Li_2O$ is added as an alkaline component, its amount is so limited that the ratio $Li_2O/(Na_2O+K_2O+Li_2O)$ is in the range of 0.025 to 0.15:1. Within this range, $Li_2O$ can bring about the low temperature melting of frit without a sacrifice of gloss and whiteness.

$TiO_2$ which is the most important component in the titania opacified enamel frit is described.

As is known, the opaque enamel of the titania opacified frit type is an enamel in which $TiO_2$ has once been molten in a glass upon melting of frit and fine crystals of $TiO_2$ appear in the enamel upon reheating at the time of firing. The chief factors by which the color of the opaque enamel is influenced are as follows.

(1) Type of $TiO_2$ crystals precipitated in the enamel.
(2) Size of precipitated $TiO_2$ crystals.
(3) Number of precipitated $TiO_2$ crystals.

The type of the $TiO_2$ crystals is described in detail later and it is preferable to use anatase than rutile.

The content of $TiO_2$ in frit has a remarkable influence on the number and size of crystallized $TiO_2$ particles or crystals of (2) and (3) and has a close relation with opacity. That is, it is very important to determine an optimum range of contents of $TiO_2$.

Ordinary enamel frits which are adapted for high temperature firing have usually a $TiO_2$ content ranging from 17 to 20%. Where the frit of this type is used and fired at temperatures of 800° to 850° C., all the $TiO_2$ components do not appear as crystals but 7 to 8% of the $TiO_2$ component is still dissolved in glass. It is known that the best opacity is obtained at the time when 10 to 12% of $TiO_2$ separates as crystals.

While the ordinary enamel frits whose firing temperature is high have a $TiO_2$ content of 17 to 20% as mentioned above, the low temperature melting enamel frit of the present invention has a $TiO_2$ content of 10 to 17%. In view of the concept of ordinary enamel frits in which the $TiO_2$ content is determined while taking into account the amount of $TiO_2$ to be dissolved in glass, the amount of precipitated $TiO_2$ particles has to be deficient within the range of the present invention. In the practice of the invention, however, the content should be in the range of 10 to 17% because of the synergistic effect with $ZrO_2$ which will be described hereinafter. Less amounts than 10% are unfavorable because crystals do not separate adequately and $TiO_2$ is held in glass as dissolved. Within the range of from 10 to 17%, the opacity increases with an increase of the content. However, larger amounts than 17% result in an abrupt decrease of opacity. The reason for this is considered as follows: too much an amount of $TiO_2$ separates with the result that the crystal growth proceeds thereby forming particles having sizes which are larger than 0.2 micron at which visible light is believed to be scattered most considerably. Accordingly, the content of $TiO_2$ is in the range of 10 to 17%.

$ZrO_2$ is usually a thermally stable compound and is molten in glass frit components at melting temperatures of frit ranging 1200° to 1300° C. $ZrO_2$ in frit does not serve to increase the softening point and has an effect of fixing the alkali components and is selectively dissolved in glass, instead of $TiO_2$, at the time of firing. This is why large amounts of $TiO_2$ are crystallized or precipitated in spite that $TiO_2$ is used in relatively small amounts. That is, $ZrO_2$ has such an effect that the reaction between an excess alkali and the precipitated $TiO_2$ is suppressed and that $TiO_2$ is selectively crystallized. The reason why satisfactory whiteness is obtained irrespective of smaller amounts of $TiO_2$ as compared with the case of ordinary enamels is largely due to the presence of $ZrO_2$. In addition, $ZrO_2$ serves to improve the gloss and water proof without increasing the softening temperature.

In practice, the content of $ZrO_2$ is in the range of 5 to 10%. Less amounts are unfavorable because alkaline components in the frit are not fixed but released with the water proof becoming poor. Moreover, because the reaction with $TiO_2$ cannot be suppressed or $TiO_2$ particles cannot be selectively crystallized as a certain form, an intended level of opacity cannot be attained. On the contrary, when the content exceeds 10%, $ZrO_2$ crystallizes with the attendant disadvantage that the resulting enameled surface is poor in gloss and opacity. In this connection, it is very important to determine the total percent of $TiO_2$ and $ZrO_2$ and the ratio of $ZrO_2$ to $TiO_2+ZrO_2$. As the result of extensive investigations made by us, it was found convenient from the viewpoint of opacity and gloss that the total of $TiO_2+ZrO_2$ is in the range of 15 to 20% and the ratio $ZrO_2/(TiO_2+ZrO_2)$ is in the range of 0.25 to 0.5:1. It is also important that the ratio $(Na_2O+K_2O)/(TiO_2+ZrO_2)$ is in the range of 0.7 to 1.3:1. If $Li_2O$ is contained, the ratio $(Na_2O+K_2O+Li_2O)/(TiO_2+ZrO_2)$ should preferably be in the range of 0.5 to 1.2:1. The reason why the upper limit of the latter ratio is smaller than that of the former ratio is due to the fact that $Li_2O$ needs $TiO_2$ and $ZrO_2$ as much and thus the ratio is limited at the upper level.

$F_2$ and $P_2O_5$ which are typical acidic components are described.

$F_2$ is important as an acidic component of frit and is essential especially for titania glazes. As described hereinbefore, $TiO_2$ is more likely to react with alkaline components than acidic components, so that titania glazes need greater amounts of acidic components than in other ordinary enamels. Aside from $F_2$ and $P_2O_5$, $SiO_2$ and $B_2O_3$ are considered usable as an acidic component. These substances are smaller in acidity than $F_2$ and cannot neutralize with alkalis. Accordingly, $F_2$ is an essential component for the purpose of the present invention and is generally contained in an amount of 2 to 10%. $F_2$ which is left as a final frit component is in a ratio of 50 to 70% of the initial addition and the residue is scattered around at the time of manufacture of the frit. The scattered $F_2$ has the effect of not only agitating the frit, but also keeping the acidic atmosphere in the frit being manufactured and is thus important. However, the content of $F_2$ defined in the present invention is that of $F_2$ contained in a final frit. It will be noted that although the state of $F_2$ in frit is not known, it is expressed herein merely as $F_2$ according to the usual practice.

Less amounts than 2% are insufficient for neutralization of alkaline components and thus satisfactory opacity cannot be obtained. On the contrary, when the amount exceeds 10%, the frit becomes too acidic, causing bubbles and cracks to be produced on the enameled surface. Good enameled surfaces cannot be obtained. Thus, $F_2$ should conveniently be contained in an amount of 2 to 10%.

$P_2O_5$ serves as a stabilizer for crystallized titanium oxide rather than as an acidic component in the practice of the invention. The titanium oxide which separates as crystals in frit is mainly composed of anatase which is converted into rutile as the firing temperature becomes higher. From the viewpoint of whiteness, anatase is superior to rutile which assumes a yellowish white color. Accordingly, anatase is preferable to rutile for use in opaque enamel. Anatase should be stably present in frit in an amount as much as possible at higher temperatures.

The presence of $P_2O_5$ is important so as to enlarge the stable region of anatase. The reason why $P_2O_5$ serves to enlarge the stable region of anatase is not clearly known theoretically. In practice, this effect develops within a range of 0.5 to 2.5%. Amounts exceeding 2.5% involve no change in opacity but result in a poor enameled surface state after firing similar to the case of $F_2$.

As having described the essential constituent components used in the practice of the invention hereinbefore, other components such as $CaO$, $Al_2O_3$, $ZnO$, $MgO$ and $BaO$ may be added to the frit composition of the invention. When these oxides are added in small amounts, the frit having such a composition as described before undergoes little of no substantial changes but use thereof in large amounts will lower the whiteness, surface state and gloss. These oxides are usually used to adjust the viscosity and thermal expansion coefficient of frit and to improve the water proof and surface state if properly used. To this end, these oxides are used in ranges not exceeding 5% as the total thereof.

Starting materials constituting the frit of the present invention are described.

SiO$_2$ may be those which are available as a siliceous powder for glass. Because Fe$_2$O$_3$ as impurity acts to color the frit therewith, the powder should preferably have a purity over 99%. Other materials such as feldspar may also be used. Starting materials for B$_2$O$_3$ include H$_3$BO$_4$, Na$_2$B$_4$O$_7$, Na$_2$B$_4$O$_7$.10H$_2$O, i.e. boric acid, glass and borax, of which boric acid is preferable because it can keep the acidic atmosphere of the molten frit.

Na$_2$O may be derived from a single component such as Na$_2$CO$_3$ or NaNO$_3$ but those which have Na$_2$O therein such as borax, sodium silicofluoride and cryolite may also be used. Similarly, as for Li$_2$O, there may be used Li$_2$CO$_3$ which is of the industrial reagent grade and is expensive. Accordingly, it is convenient to use spodumene to be a natural ore.

Naturally occurring ZrO$_2$ usually contains Fe$_2$O$_3$ as an impurity and its purified product is expensive, so that it is preferable to use zircon (ZrO$_2$.nSiO$_2$) which is a compound of ZrO$_2$ and SiO$_2$. This zircon is not only inexpensive, but also more readily dissolves in frit than ZrO$_2$ alone. Crystal forms of TiO$_2$ include those of anatase and rutile, either of which may be used as a starting material.

F$_2$ may be used in various forms including LiF, NaF, KF, CaF$_2$, Na$_2$SiF$_6$, Na$_3$AlF$_6$, K$_2$SiF$_6$ and the like. Any of these compounds may be used and a starting materials used should be determined in consideration of the amount of cations. A starting material for P$_2$O$_5$ is properly selected from Ca$_3$(PO$_4$)$_2$, Na$_2$HPO$_4$, NaH$_2$PO$_4$, etc. and used in an amount as required.

The above-described starting materials are compounded in the defined ranges of amounts, respectively. The sufficiently dried and mixed materials can thermally be molten at temperatures ranging from 1100° to 1300° C. The heating temperature and time should be properly controlled because a final composition of the frit is varied depending on the temperature and time conditions. After the melting of the starting materials, vitrification is caused to proceed for 20 to 40 minutes. Longer times result in the sublimation of the alkali components and too long a vitrification time should be avoided. After the vitrification, the resulting frit is charged into water and ground into pieces.

The present invention is described in detail by way of the following examples.

EXAMPLE 1

Starting materials were so mixed as to have a composition comprising 9.0% of Na$_2$O, 8% of ZrO$_2$, 12% of TiO$_2$, 10% of K$_2$O, 7% of F$_2$, 2% of P$_2$O$_5$, 1% of CaO and the balance, i.e. 51% of SiO$_2$ and B$_2$O$_3$. The melting temperature was 1200° C. and after the melting of the starting materials, the melt was held at the same temperature for 30 minutes. SiO$_2$ and B$_2$O$_3$ were mixed to have different compositions as indicated in Table 1.

The resulting frits were each charged into a ball mill along with mill additives and reduced into pieces. The mill additives were composed of 5 parts by weight of clay, 0.25 part by weight of sodium nitrite, 0.5 part by weight of urea, and 43 parts by weight of water, each based on 100 parts by weight of the frit. The resulting enamel was coated in a thickness of 100 to 150 microns by means of a spray gun on a steel plate which had previously been treated with a nickel and which had a size of 50×90 mm and a thickness of 0.6 mm. After drying, the coated plate was fired at 700° C. for 5 minutes.

These samples were evaluated according to the following methods.

(1) Opacity

L, a and b values obtained from color stimuli X, Y and Z expressed by the CIE standard chromaticity diagram were measured by the color difference meter and a whiteness (W) was calculated from the following equation.

$$W = 100 - \sqrt{(100-L)^2 + a^2 + b^2}$$

A greater value W exhibits a more whitish color. In general, enameled articles are felt as white to the eye when the W value is over 85. This value was taken as a measure for the whiteness in our experiments.

(2) Gloss

The gloss of an enameled surface was measured by the use of a gloss meter (VG-107, manufactured by Nippon Denshoku Ind. Co., Ltd.). Usually, the gloss on an enameled surface is satisfactory when exceeding 90.

(3) Adherence Strength

According to the procedure prescribed in JIS R 4301, a sample was placed on an oak plate and a steel ball was dropped at a height of 1 m from the sample, followed by judging an adherence strength from a degree of coming off of the enameled layer caused by the dropping. Indicated by "Good" is a case where no enameled layer comes off, by "Moderate" is a case where a slight degree of coming-off occurs, and by "Bad" is a case where a substantial degree of coming-off occurs.

(4) Surface State

The state of enameled surfaces was observed and the degree of cracks, bubbles, orange peel and irregularities was checked. Indicated by "Good" is a case where no defects are produced, by "Moderate" is a case a slight degree of defects are seen, and by "Bad" is a case where a number of defects are observed.

The results of these evaluation tests are summarized in Table 1 below.

TABLE 1

| No. | SiO$_2$ (%) | B$_2$O$_3$ (%) | SiO$_2$/B$_2$O$_3$ | Whiteness | Gloss | Adherence Strength | Surface State |
|---|---|---|---|---|---|---|---|
| 1 | 25 | 26 | 0.96 | 81.3 | 32 | Good | Bad |
| 2 | 28 | 23 | 1.22 | 82.0 | 54 | Good | Bad |
| 3 | 30 | 21 | 1.43 | 85.9 | 85 | Good | Moderate |
| 4 | 34 | 17 | 2.0 | 91.2 | 102 | Good | Good |
| 5 | 36 | 15 | 2.4 | 89.0 | 98 | Good | Good |
| 6 | 38 | 13 | 2.92 | 87.3 | 87 | Bad | Bad |
| 7 | 40 | 11 | 3.64 | 85.4 | 74 | Bad | Bad |

As will be apparent from Table 1, the optimum amount of SiO$_2$ is in the range of 30 to 36%. Likewise, the optimum amount of B$_2$O$_3$ is in the range of 15 to 21% but when the amount of B$_2$O$_3$ is 21%, bubbles are apt to be produced on the enameled surface and thus the upper limit is preferably 20%.

EXAMPLE 2

There were prepared frit compositions comprising 33 to 35% of SiO$_2$, 17 to 18% of B$_2$O$_3$, 12 to 12.5% of TiO$_2$, 7.2 to 7.4% of ZrO$_2$, 0.9 to 1.2% of Li$_2$O, 10 to 10.5% of K$_2$O, 0.9 to 1.1% of CaO, 7.5 to 7.8% of F$_2$, and 1.8 to 2.0% of P$_2$O$_5$, in which the content of Na$_2$O was varied so as to measure the opacity W. Then, Example 1 was repeated thereby obtaining enameled samples. In FIG. 1, there is shown the relation between the content of $Na_2O$ and the W value.

As will be apparent from FIG. 1, the opacity W takes a value over 85 when the $Na_2O$ content is in the range of 7 to 9%. The adherence strength was found as "Good" when the content was over 7%, inclusive, and the surface state became irregular when the content was smaller than 7% because of poor fluidity of the enamel. When the content exceeded 9%, the enameled plates assumed the orange peel on the surface thereof, which was believed to result from an excess of the alkalis being dissolved out in the frit. Accordingly, a suitable range of $Na_2O$ is 7 to 9%.

EXAMPLE 3

In this example, compositions having the same content ranges of $SiO_2$, $B_2O_3$, $TiO_2$, $ZrO_2$, $Li_2O$, $CaO$, $F_2$, and $P_2O_5$, and 7 to 9% of $Na_2O$ were used but the content of $K_2O$ was varied. Samples were made in the same manner as in Example 1 using these frit compositions. The relation between the content of $K_2O$ and the opacity W is shown in FIG. 2.

Figure 2:
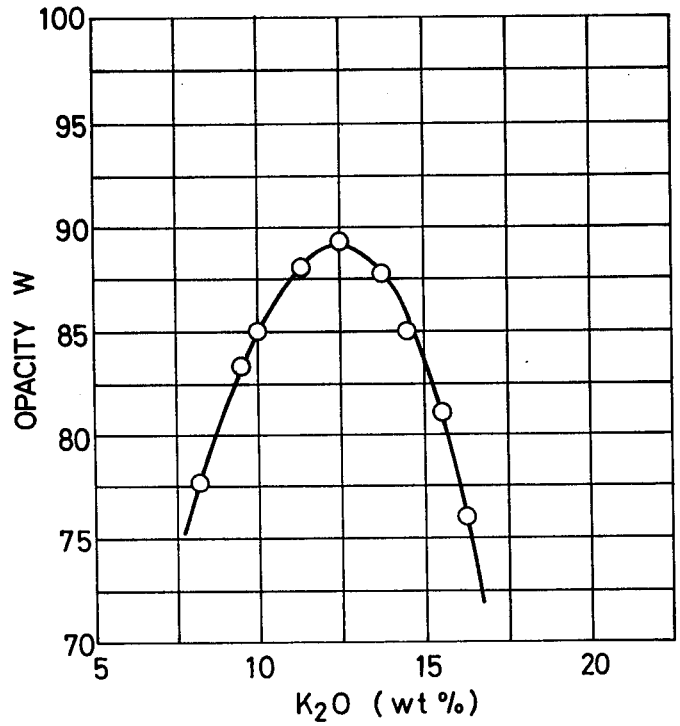
FIG. 2 is similar to FIG. 1 and shows the relation between the amount of $K_2O$ and the whiteness.

FIG. 2 shows that the value W is over 85 when the content of $K_2O$ is in the range of 10 to 14%. In this connection, the content ranging from 7 to 15% results in a gloss over 90%. The gloss is less than 90% in amounts less than 7% and larger than 15%. Especially when $K_2O$ is contained in excess, the gloss was found to be less than 50%. The adherence strength and surface state were found as "Good" when the amount of $K_2O$ was in the range of 7 to 15%.

EXAMPLE 4

Figure 3:
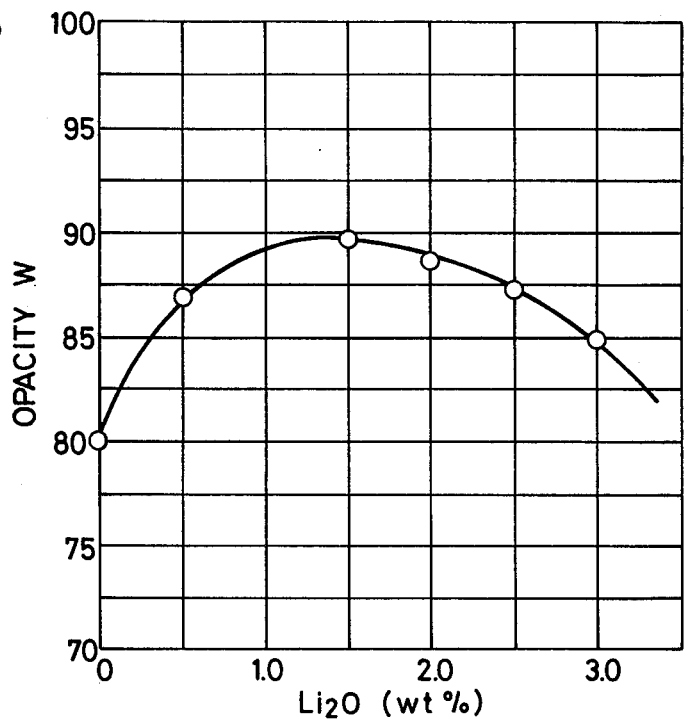
FIG. 3 is a graph showing the relation between the amount of $Li_2O$ and the whiteness.

Compositions having the same content ranges of $SiO_2$, $B_2O_3$, $TiO_2$, $ZrO_2$, $CaO$, $F_2$ and $P_2O_5$ as in Example 2, and also 7.5 to 7.8% of $Na_2O$ and 10 to 10.5% of $K_2O$ were prepared, in which the amount of $Li_2O$ was varied. Enameled samples were made in the same manner as in Example 1. The relation between the content of $Li_2O$ and the opacity W is shown in FIG. 3.

When the content of $Li_2O$ exceeds about 3%, the W value becomes lower than 85. The gloss was found to be about 100 up to a level of $Li_2O$ of 2%, sharply lowered below 90 when the content exceeded 3%, and was about 30 at a level of about 4%. The adherence strength increases with an increase of the amount of $Li_2O$ but the surface was in the form of orange peel and was thus poor as the amount increased. Accordingly, the suitable amount of $Li_2O$ is in the range below 3%.

EXAMPLE 5

Figure 4:
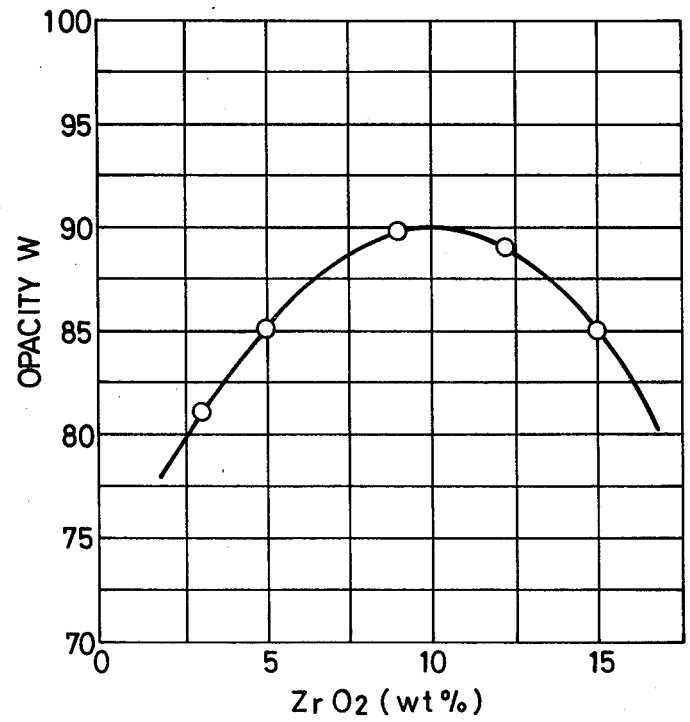
FIG. 4 is a graph showing the relation between the amount of $ZrO_2$ and the whiteness.

Frit compositions comprising 33 to 35% of $SiO_2$, 17 to 18% of $B_2O_3$, 12 to 12.5% of $TiO_2$, 0.9 to 1.2% of $Li_2O$, 10 to 10.5% of $K_2O$, 7.5 to 8.0% of $Na_2O$, 0.9 to 1.1% of $CaO$, 7.5 to 7.8% of $F_2$, and 1.8 to 2.0% of $P_2O_5$ were prepared provided that $ZrO_2$ was varied in amounts. Then, Example 1 was repeated with the result shown in FIG. 4.

As will become apparent from the figure, the value W increases with an increase of $ZrO_2$, but lowers when it exceeds 15% because the glass components become difficult to dissolve in the frits. In case where the content is over 10%, the gloss is at a level below 50%, with the adherence strength and surface state becoming "Bad". On the contrary, when the content of $ZrO_2$ is less than 5%, the reaction between the coexisting alkalis and $TiO_2$ takes place. As a result, the value W lowers. In order to fix the alkalis, at least 5% of $ZrO_2$ is needed.

EXAMPLE 6

Figure 5:
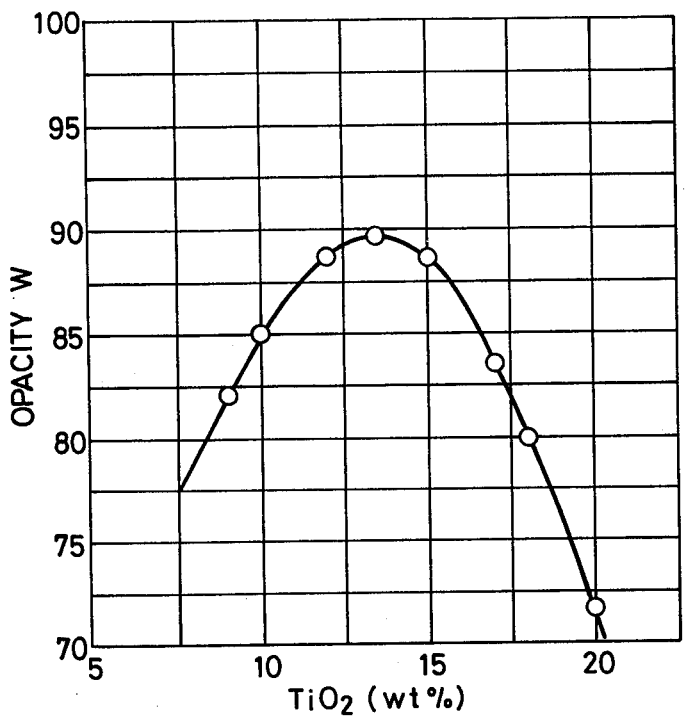
FIG. 5 is a graph showing the relation between the amount of $TiO_2$ and the whiteness.

There were prepared frit compositions which were comprised of 33 to 35% of $SiO_2$, 17 to 18% of $B_2O_3$, 7.2 to 7.4% of $ZrO_2$, 0.9 to 1.2% of $Li_2O$, 10 to 10.5% of $K_2O$, 7.5 to 8.0% of $Na_2O$, 0.9 to 1.1% of $CaO$, 7.5 to 7.8% of $F_2$, 0.5 to 2.5% of $P_2O_5$ and in which the amount of $TiO_2$ was varied. Then, Example 1 was repeated. The relation between the value W and the amount of $TiO_2$ is shown in FIG. 5.

As will become apparent from the figure, the value W increases when the $TiO_2$ content exceeds 10% but it decreases when the content is over 15%. As described hereinbefore, this is considered for the reason that $TiO_2$ grows into crystals having a size larger than 0.2 microns at which the reflectance becomes the highest. Moreover, when the content exceeds 17%, the gloss becomes lower than 50 and irregularities are produced on the enameled surface. Thus, the surface state is evaluated as "Bad" and the adherence strength was also "Bad". Accordingly, the $TiO_2$ content is suitably determined in the range of 10 to 17%.

EXAMPLE 7

Figure 6:
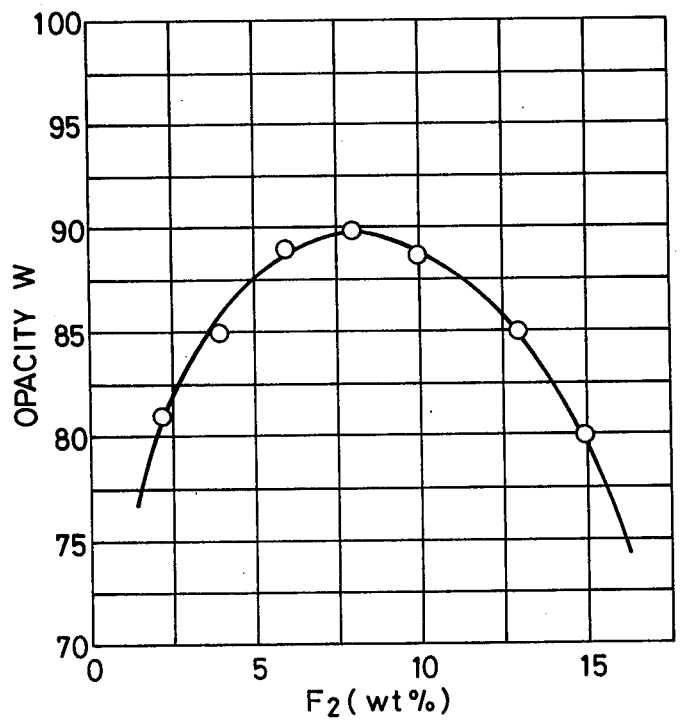
FIG. 6 is a graph showing the relation between the amount of $F_2$ and the whiteness.

There were prepared frit compositions which were comprised of 33 to 35% of $SiO_2$, 17 to 18% of $B_2O_3$, 7.2 to 7.4% of $ZrO_2$, 0.9 to 1.2% of $Li_2O$, 10 to 10.5% of $K_2O$, 7.5 to 8.0% of $Na_2O$, 12 to 12.5% of $TiO_2$, 0.9 to 1.1% of $CaO$, and 0.5 to 2.5% of $P_2O_5$ and in which the content of $F_2$ was varied. Then, Example 1 was repeated. The relation between the value W and the content of $F_2$ is shown in FIG. 6.

As will become apparent from the figure, the value W becomes maximal at an optimum level of $F_2$ and the value W is over 85 in the range of 4 to 13%. This range of $F_2$ is that which is determined as the theoretical at the time of the charge. The chemical analysis of the frits revealed that the contents in these frits were in the range of 2 to 10%. Accordingly, a suitable content of $F_2$ is in the range of 2 to 10%. Less contents result in a low value of W, whereas larger contents than 10% (13% as the theoretical) result in bubbles on the enameled surface and also in the evaluation as "Bad" with regard to the adherence strength.

EXAMPLE 8

Figure 7:
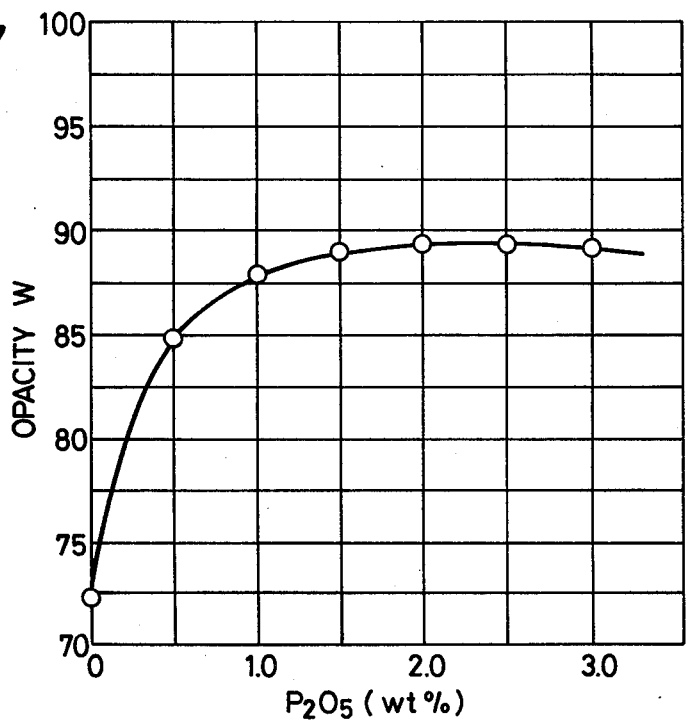
FIG. 7 is a graph showing the relation between the amount of $P_2O_5$ and the whiteness.

Frit compositions of Example 7 were used except that the content of $F_2$ was in the range of 7.5 to 7.8% and $P_2O_5$ was varied in amounts. The relation between the value W and the content of $P_2O_5$ is shown in FIG. 7.

As will become apparent from the figure, the effect of addition of $P_2O_5$ appears at a level higher than 0.5%, and little changes of the value W are recognized even when the content increases. However, contents exceeding 2.5% result in bubbles on the surface and poor adherence strength. Accordingly, a suitable content is in the range of 0.5 to 2.5%.

EXAMPLE 9

A frit composition which was composed of 33% of $SiO_2$, 17% of $B_2O_3$, 9% of $Na_2O$, 8% of $ZrO_2$, 12% of $TiO_2$, 10% of $K_2O$, 7% of $F_2$, and 2% of $P_2O_5$ was provided, to which was added 2% of $Al_2O_3$. This frit was used to make a sample according to the procedure of Example 1 and the sample was subjected to the measurement of a W value. The value was found to be 91 and the gloss was 101 with the surface state and adherence strength evaluated as "Good".

EXAMPLE 10

Example 9 was repeated except that $Al_2O_3$ was replaced by the same amount of $ZrO_2$. The resulting sample had a W value of 91.5 and a gloss of 100 with the surface state and adherence strength evaluated as "Good".

EXAMPLE 11

Example 9 was repeated except that $Al_2O_3$ was replaced by the same amount of MgO. The resulting sample had a W value of 89 and a gloss of 97 with the surface state and adherence strength evaluated as "Good".

EXAMPLE 12

Example 9 was repeated using, instead of $Al_2O_3$, the same amount of BaO. The resulting sample had a W value of 88 and a gloss of 96 with the surface state and adherence strength evaluated as "Good".

EXAMPLE 13

The frit of Example 9 was used but a plate thickness of a base material was changed to measure the strain caused on firing for comparison with that of a known high temperature opaque enamel having such a composition as indicated in "Description of the Prior Art".

Figure 8:
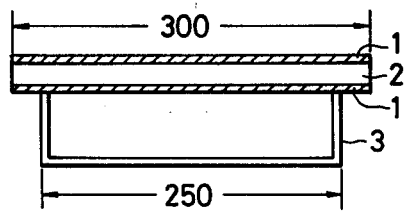
FIG. 8 is an illustrative view of the measurement of strain caused on firing.
Figure 9:
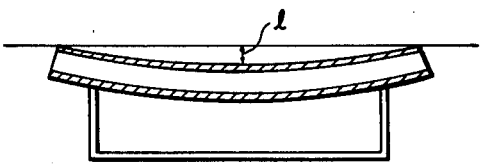
FIG. 9 is an illustrative view showing the state of a strained plate after firing.

The measurement of the strain caused on firing is described. A test plate which had a predetermined thickness and a size of 60×300 mm and was free of any strains was applied with a enamel slip on the respective surfaces thereof each in an enameled layer thickness of 100 microns. This plate was horizontally held at an interval of 250 mm as shown in FIG. 8, followed by firing at a predetermined temperature and then allowing to cool. In FIG. 8, indicated at 1 are enameled layers, at 2 is a base metal, and at 3 is a firing and holding tool. If a strain was produced as shown in FIG. 9, the quantity of strain, 1, which was a length of a perpendicular to the original horizontal line from a maximum strained portion, was measured.

The firing conditions where the frit of the present invention was used were 690° C. and 5 minutes, whereas those for the known high temperature opaque enamel were 820° C. and 5 minutes. Under these conditions, there was obtained a relation between the plate thickness and the firing strain.

The results are shown in Table 2 below.

TABLE 2

| Frit | Plate Thickness | | | | |
|---|---|---|---|---|---|
| | 0.4 mm | 0.5 mm | 0.6 mm | 0.8 mm | 1.0 mm |
| Known High Temperature Opaque Enamel Frit | Bad | Bad | Moderate | Good | Good |
| Opaque Enamel Frit of Invention | Good | Good | Good | Good | Good |

Good: 1 is below 1 mm.
Bad: 1 is in the range over 3 mm.
Moderate: 1 is in the range of 1 to 3 mm.

As will be apparent from the above results, use of the known high temperature firing enamel requires a plate thickness over 0.6 mm in view of the strain produced on firing, and thus enameled articles naturally become heavy.

In contrast, the opaque enamel frit of the present invention can be fired at a temperature below the $A_1$ transformation point of iron (723° C.), so that no thermal strain is involved in the course of the firing. Accordingly, metal plates which are as thin as 0.4 mm or 0.5 mm as will not be applied with known enamel frits can be used, leading to the saving of metal materials. Additionally, it is possible to obtain light enameled wares.

Moreover, it was found that the firing temperature could be lowered by about 100° to 150° C. as compared with those for known enamels, resulting in the saving of energy at the time of the enameling process and the reduction of fuel cost by 25 to 35%.

As will be apparently seen from the foregoing examples, the low melting opaque enamel frits of the invention has a number of advantages over known frits.

The frits of the invention have a softening point below 600° C. and if constituents of relatively low softening points within the scope of the invention are used, the resulting frit can be applied to not only ordinary enameling steel plates, but also aluminium or aluminized steel plates. Also, it may be applied to stainless steels.

As a matter of course, the frit of the invention can be used not only for decorative purposes, but also for the purpose of improving insulating property of various substrates.

What is claimed is:

1. A low melting, opaque enamel frit free of lead which consists essentially of a combination of 30 to 36 wt % of $SiO_2$, 15 to 20 wt % of $B_2O_3$, 7 to 9 wt % of $Na_2O$, 5 to 10 wt % of $ZrO_2$, 10 to 17 wt % of $TiO_2$, 7 to 15 wt % of $K_2O$, 2 to 10 wt % of $F_2$, and 0.5 to 2.5 wt % of $P_2O_5$ as a stabilizer for the crystallized titanium oxide to enlarge the stable region of anatase in the crystallized titanium oxide, the total of $Na_2O$ and $K_2O$ being in the range of 14 to 20 wt %, the total of $TiO_2+ZrO_2$ being in the range of 15 to 20 wt %, the $ZrO_2/(TiO_2+ZrO_2)$ ratio being in the range of 0.25 to 0.5:1, the $SiO_2/B_2O_3$ ratio being in the range of 1.5 to 2.4:1, the $Na_2O/K_2O$ ratio being in the range of 0.6 to 1.0:1, the $(Na_2O+K_2O)/(TiO_2+ZrO_2)$ being in the range of 0.7 to 1.2:1.

2. A low melting, opaque enamel frit according to claim 1, further comprising up to 3 wt % of $Li_2O$, the $Li_2O/(Na_2O+K_2O+Li_2O)$ being in the range of 0.025 to 0.15:1.

3. A low melting, opaque enamel frit according to claim 1, further comprising up to 5 wt % of at least one member selected from the group consisting of CaO, $Al_2O_3$, ZnO, MgO, BaO.

4. A low melting, opaque enamel frit according to claim 1, wherein starting materials for the respective components are thermally molten at a temperature of 1100° to 1300° C. and after the melting, the melt is subjected to vitrification for 20 to 40 minutes.

5. A low melting, opaque enamel frit according to claim 1, wherein the content of $K_2O$ is in the range of 10 to 14 wt %.

* * * * *